Sept. 20, 1949.  R. E. GORDINIER  2,482,708
PLUNGER ACTUATED HOLD-DOWN CLAMP
Filed June 29, 1944
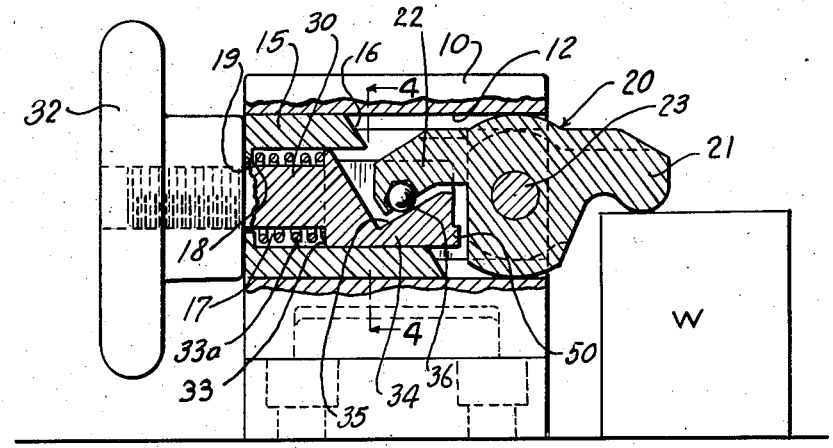
FIG. 1.
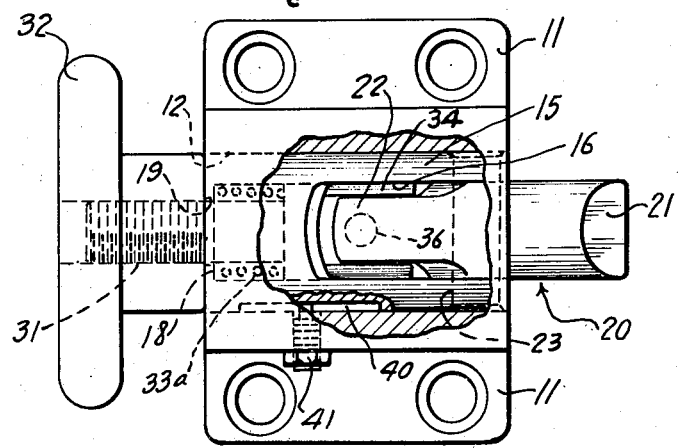
FIG. 2.
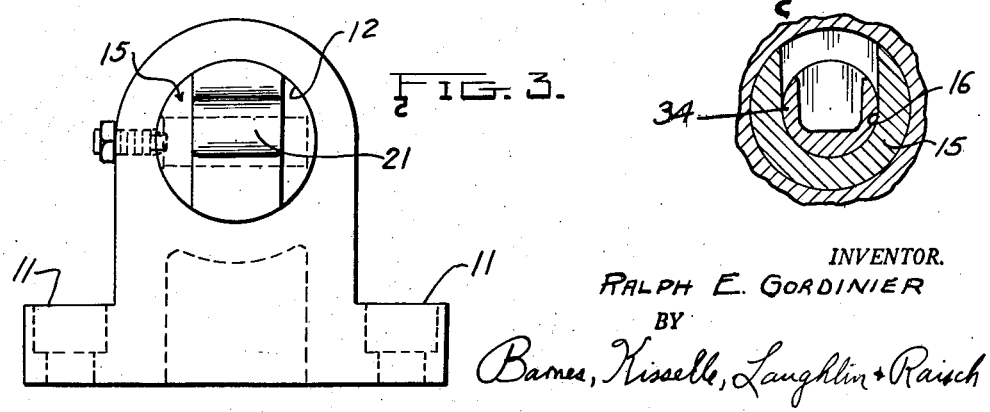
FIG. 3.
FIG. 4.
INVENTOR.
RALPH E. GORDINIER
BY
Barnes, Kisselle, Laughlin & Raisch Patented Sept. 20, 1949

2,482,708

UNITED STATES PATENT OFFICE 2,482,708

PLUNGER ACTUATED HOLD-DOWN CLAMP

Ralph E. Gordinier, Detroit, Mich., assignor to Special Engineering Service, Incorporated, Detroit, Mich., a corporation of Michigan Application June 29, 1944, Serial No. 542,759

2 Claims. (Cl. 144—290)

This invention relates to a production clamp.

As a work holder for production of small pieces, it is sometimes desirable to provide a small clamp for locking identical pieces in position before a workman for a small operation. It is also desirable that this clamp be readily opened and closed. A great degree of movement is not necessary since the clamp would be set up for any particular piece of work.

The present invention contemplates a small but sturdy clamp which is intended particularly for use in production work. Other objects and features of the invention relating to details of design will be evident from the following description and claims.

In the drawings:

Fig. 1 is a vertical section of the assembly in operative position.

Fig. 2 is a plan view of the clamp.

Fig. 3 is an elevation of the clamping end.

Fig. 4 is a section on line 4—4 of Fig. 1.

In the drawings, a base 10 having side flanges 11 is provided with a cylindrical opening 12. Slidable in the opening 12 is a cylindrically shaped plunger 15 which is provided at one end with a slot 16 and at the other end with a bore 17 ensmalled at its outer end to form a wall 18 and an opening 19.

Within the slot 16 of plunger 15 is mounted a T-shaped clamping dog 20 having an extending nose 21 for clamping purposes and a projection 22 for operating purposes. This dog is mounted on a pin 23 which passes through the dog and into holes on either side of plunger 15.

Slidable within the bore 17 of plunger 15 is an operating stud 30. One end 31 of the stud is threaded and passes through the opening 19 of plunger 15 into a threaded handle 32. The other end of the stud is enlarged to a shoulder 33 which retains a spring 33a in the bore of plunger 15 and against shoulder 18. This enlarged end 34 of stud 30 is provided with a recess cylindrical in nature but positioned at an angle to the axis of the stud so that a surface 35 is formed as shown in Fig. 1. The projection 22 from dog 20 is shaped to fit into the recess in the stud and has a ball 36 mounted in its lower surface to cooperate with surface 35 of the stud.

A slot 40 is formed in the side of plunger 15 to cooperate with a locking screw 41. With the screw in place as shown in Fig. 2 the plunger 15 can be shifted back and forth in the bore 12 so that the nose 21 may take various positions relative to the base 10. At any one of these positions handle 32 may be turned to the right to pull stud end 34 against the spring 33a. Relative movement of the stud with member 15 will cause the ball 36 to ride up on surface 35 and tilt the nose 21 downward to the point where it contacts and clamps the work. To release the work, the handle 32 may be rotated in the opposite direction. Spring 33a will then press against the stud end 34 moving it to the right as shown in Fig. 1. A projection 50 on stud end 34 moves against the lower portion of dog 20 and causes upward movement of the nose 21. Thus there is positive locking and positive release. The locking force applied by nose 21 also locks the plunger 15 in any position it is placed for a particular job.

Referring to Fig. 1, is will be seen that if a downward force is exerted by nose 21, a downward reaction will be exerted by member 22 on stud end 34. To prevent binding of the stud a large bearing surface has been provided as shown in Fig. 4. The cylindrical section of member 34 bears through 180° in its recess 16 in plunger 15. With this design there is no binding when great forces are applied through the tremendous leverage of the screw 31.

The angle of surface 35 to the horizontal is also important. It is shown as 30°. This must be correlated with the pitch of threads 31 to the extent that a relatively short movement of stud end 34 gives the desired clamping movement and clamping leverage. An angle of from 25° to 35° has been found most satisfactory.

I claim:

1. A production clamp comprising a base having an elongated horizontal opening therethrough, a plunger in the form of a self-contained cartridge unit slidably mounted in said opening and having a recess formed in one end thereof, a lever mounted in said recess for pivotal movement in a vertical plane and having a pair of downwardly projecting hook portions on opposite sides of its pivotal support, one of said hook portions being arranged to extend out of the opening in said base and the other hook portion extending into said recess, a slide member in said recess having a threaded shank projecting out through the end of said plunger remote from said lever, a hand wheel threadedly engaged with said shank and having a bearing surface arranged to bear against the adjacent end face of said plunger, said slide member having an inclined surface at the inner end thereof co-acting with and disposed beneath the inwardly extending hook portion of said lever so as to pivot said hook portion upwardly when the slide member is actuated by said hand wheel in a direction away from said lever and thereby pivot the outwardly extending hook portion downwardly with a clamping pressure against an object disposed beneath it.

2. A production clamp comprising a base having an elongated horizontal opening therethrough, a plunger in the form of a self-contained cartridge unit slidably mounted in said opening and having a recess formed in one end thereof, a lever pivoted in said recess on a horizontal axis transversely of the axis of said plunger, said lever having a pair of downwardly hooked portions thereon on opposite sides of its pivotal axis, one of said hook portions extending out of the opening in said base and the other hook portion extending into said recess, said inwardly extending hook portion having a downwardly facing surface thereon inclined downwardly and away from the pivotal axis of said lever, an actuating member slidably mounted in said recess and having a threaded shank projecting out through the end of said plunger remote from said lever, a hand wheel threaded on said projecting shank portion and having a surface disposed to bear against the adjacent end face of said plunger, said actuating member having a surface at the inner end thereof inclined upwardly in the direction of said lever, said upwardly inclined surface being arranged beneath the downwardly inclined surface of said inwardly extending hook portion, and a ball member mounted in the inclined face of said hook portion, said ball member projecting into the path of movement of the inclined face of said actuating member whereby when said hand wheel is actuated to slide said actuating member within said recess in a direction away from said lever, said ball member rides up the inclined face of said actuating member to pivot the inwardly extending hook portion of said lever upwardly and the outwardly extending portion downwardly with a clamping pressure against an object arranged beneath said outwardly extending hook portion, said plunger being locked in position in the opening in said base by the clamping pressure exerted by said outwardly extending portion.

RALPH E. GORDINIER.

REFERENCES CITED

The following references are of record in the file of this patent:

UNITED STATES PATENTS

| Number | Name | Date |
|---|---|---|
| 310,839 | Mickel | Jan. 13, 1885 |
| 492,435 | Rittenhouse | Feb. 28, 1893 |
| 492,931 | Baird | Mar. 7, 1893 |
| 1,022,761 | Stvanek | Apr. 9, 1912 |
| 1,220,423 | Huisinger et al. | Mar. 27, 1917 |
| 1,424,034 | Rigert | July 25, 1922 |
| 1,383,429 | Russell | July 5, 1929 |
| 1,822,501 | Onsrud | Sept. 8, 1931 |
| 1,954,444 | Early | Apr. 10, 1934 |

FOREIGN PATENTS

| Number | Country | Date |
|---|---|---|
| 56,426 | Sweden | Apr. 1, 1924 |